Dec. 28, 1926.　　　　　　　　　　　　　　1,611,896
T. W. DIKE
VENEER LATHE
Filed Feb. 27, 1925　　　　3 Sheets-Sheet 1

INVENTOR.
Theodore W. Dike
By Macleod, Calver, Copeland & Dike
Attys.

Dec. 28, 1926.

T. W. DIKE

VENEER LATHE

Filed Feb. 27, 1925   3 Sheets-Sheet 2

1,611,896

INVENTOR:
Theodore W. Dike
by Macleod Calvin Copeland & Dike
ATTYS.

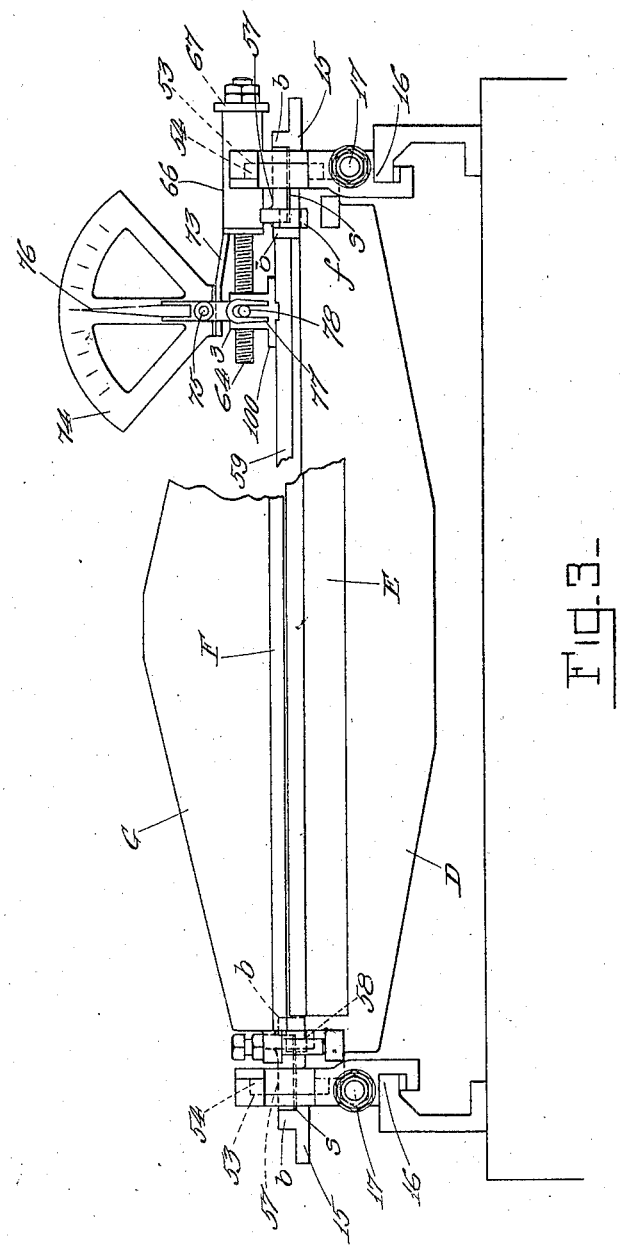

Patented Dec. 28, 1926.

1,611,896

UNITED STATES PATENT OFFICE.

THEODORE W. DIKE, OF NEW WESTMINSTER, BRITISH COLUMBIA, CANADA, ASSIGNOR TO THE LAMINATED MATERIALS COMPANY LIMITED, OF NEW WESTMINSTER, CANADA, A CORPORATION OF BRITISH COLUMBIA, CANADA.

VENEER LATHE.

Application filed February 27, 1925. Serial No. 12,101.

The present invention relates to rotary lathes for use in cutting veneer from logs. The particular object of the invention is to provide mechanism in such a lathe which will permit the lathe to be adjusted instantaneously to cut different thicknesses of veneer, according to the log which is being operated upon and the requirements for veneer to be produced.

In veneer lathes as heretofore constructed, the work of adjusting the lathe for different thicknesses of veneer has ordinarily required from ten to twenty minutes with subsequent loss of time to correct mal-adjustment, and the accuracy of the adjustment is dependent on the skill of the operator. The result of this construction has been that it has been customary in veneer mills to run for as long as possible on one thickness of veneer regardless of the character of the logs, since owing to the length of time taken to adjust the lathe, it is practically out of the question to change during the cutting of a log or even between logs, and it has been necessary to cut the log into whatever thickness of veneer the lathe is set for instead of setting the lathe to cut the log into the thickness which will be most advantageous. Furthermore, different parts of the log can frequently be used economically in different thicknesses of veneer.

My invention provides a lathe which can be changed in a few seconds from any thickness to any other. Therefore, after barking the log the operator can set the lathe for whatever thickness the exposed portion of the log is best adapted; can continue to cut the log at that thickness until the conditions change, and then instantly reset the lathe. This gives the latheman the opportunity to use all the timber which comes to him for the particular purpose for which the log or portion of the log is best adapted to be used. A large economy in timber results. My experience shows that this saving is in the neighborhood of fifteen percent although it varies greatly with the particular conditions.

Furthermore, since a clear stock is required for face plies, and since the value of the product depends largely on the proportion of panels produced which are faced with clear stock, it is possible by the use of my improved lathe to increase the value of the product of the mill by increasing the superficial area of clear stock produced. Since the face plies can be made very thin, any log or part of a log from which clear stock can be produced can be used to face a much larger number of panels than theretofore.

To accomplish these results, I have provided mechanism by which the speed of the feed of the knife carriage toward the centre of the log may be changed instantly to any other speed, and have included in the possible speeds a rapid one for use in slabbing or barking the log. Furthermore, since the position of the pressure bar relative to the knife edge must be adjusted to each thickness of veneer, I have provided means for accomplishing this adjustment comparatively instantaneously and have connected to it indicating mechanism which will show the operator at a glance the position of the pressure bar relative to the knife. In practice, the indicator is calibrated to give the proper adjustment for each of the several thicknesses of veneer which the lathe will cut. By these arrangements it is possible for the operator or operators to have the several working instrumentalities of the lathe all in proper working relation to each other, even though frequent changes in thickness of veneer to be cut are made. It is also possible to increase or diminish the pressure on the pressure bar according to the character of the log being cut without stopping the lathe.

The invention will be fully understood by reference to the following description, taken in connection with the accompanying drawings, and the novel features thereof are pointed out and clearly defined in the claims at the close of this specification.

Referring to the drawings Fig. 1 is a top plan view partly in section of a lathe embodying my invention.

Fig. 3 is a front elevation of the knife and pressure bar and associated parts.

Figure 1:
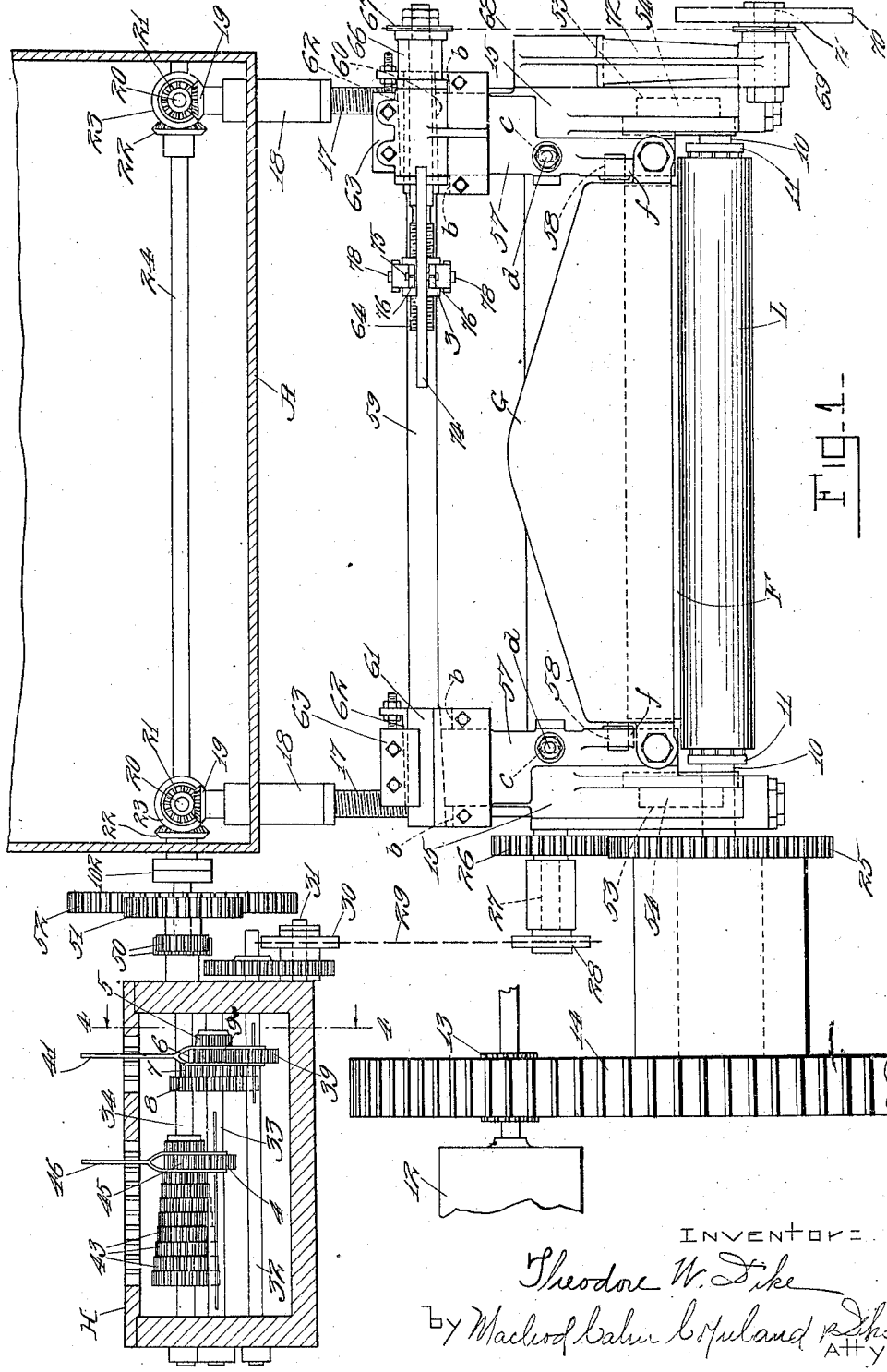

In the drawings, at 10 is shown the lathe spindle, and at 11 the chucks which hold the log. The log is shown at L and the veneer which is being produced is shown at B in Fig. 2. The lathe is driven by any suitable power as for instance an electric motor 12. In the drawings I have shown the motor as operating a pinion 13 which engages a large gear 14 on the outer end of the lathe spindle. It will be understood that there are companion gears on the other end of the latter, but as they form no part of the present invention they have been omitted to simplify the drawings. The frame of the machine has ways 16 on which the knife carriage rests. This knife carriage consists primarily of end members 15, generally called "way-blocks" on which act the screws 17 which feed the carriage. The knife bar is designated D, the knife E, the pressure bar F, and the pressure bar support G. The log side of the lathe is ordinarily referred to as the front and the veneer side as the back side of the lathe. The back ends of the screws 17, 17 rest in bearings 18 in the frame A of the machine and carry bevel gears 19, 19. At the back of the lathe and at each end are vertical shafts 20 carrying bevel gears 21 which mesh with the bevel gears 19 on the back ends of the feed screws. The shafts 20, 20 are themselves rotated by the bevel gears 22 and 23 which are themselves driven by a horizontal shaft 24. It will therefore be seen that the rate of speed and consequently the thickness of the veneer cut is dependent upon the speed with which the shaft 24 rotates relatively to the speed of rotation of the log. Accordingly to permit the lathe to cut different thicknesses of veneer and to make possible a rapid change from one thickness to another, I provide a selective change speed gear in the train which operates the screw drive.

Starting now with the log spindle, the drive for the feed screws will be traced. On the log spindle 10 is a spur gear 25 meshing with an idle gear 26 on a shaft 27. This shaft 27 carries a sprocket 28 which actuates a chain 29 running over a sprocket 30. This chain 29 drives the driving shaft 31 of a gear box H.

The gear box H is provided with two intermediate shafts 32 and 33 and a driven shaft 34. On the intermediate shaft 33 there are a series of four gears 5, 6, 7 and 8 of different diameters. On the shaft 32 is a sliding pinion 39 permanently in mesh with a tumbler pinion 9 mounted on a fork 41 having a handle which projects through the side of the gear box (see Figs. 4 and 5). By lifting up this handle, the tumbler pinion 9 may be disengaged from whichever of the pinions 5, 6, 7 or 8 on the intermediate shaft 33 it is engaged with, and after sliding the fork 41 with the pinion 39 and tumbler pinion 9 along the shaft 32, the tumbler pinion 9 may then be reengaged with any other of the gears 5, 6, 7 and 8. On the driven shaft 34 is another series of pinions of different diameters. In the drawings I have shown ten, all of which are designated 43. On the second intermediate shaft 33 is a pinion 4 permanently in mesh with a tumbler pinion 45 carried by a fork 46 which has a handle projecting through the side of the gear box in the manner already described in connection with the sliding gear 39 on the other intermediate shaft 32. The fork 46 may be slid along the shaft 33 and thus the tumbler gear 45 may be engaged with any of the series of gears 43. It will therefore be seen that there are forty possible combinations which can be made by means of this gear box so that the knife carriage can be driven at forty different rates of speed relative to the rotation of the log, thus cutting forty different thicknesses of veneer, and that the lathe may be changed from any one thickness to any other thickness by shifting the positions of the two handles of the gear box. In practice, I provide one speed more rapid than any of the others especially intended for barking and slabbing, this being an important time-saving arrangement, as it enables the operator to bark or slab the log at a uniform and efficient speed. The driving shaft 34 acts through gears 50 to drive a gear 51 which meshes with a gear 52 on the shaft 24. On the shaft 24 is located a clutch 102, whereby the feed screws may be released from the gear train when it is desired to change the rate of feed.

The mechanism by which the pressure bar F is adjusted relatively to the knife E so that the proper pressure will be supplied for the several thicknesses of veneer, will now be described.

Figures 2, 4, 5:
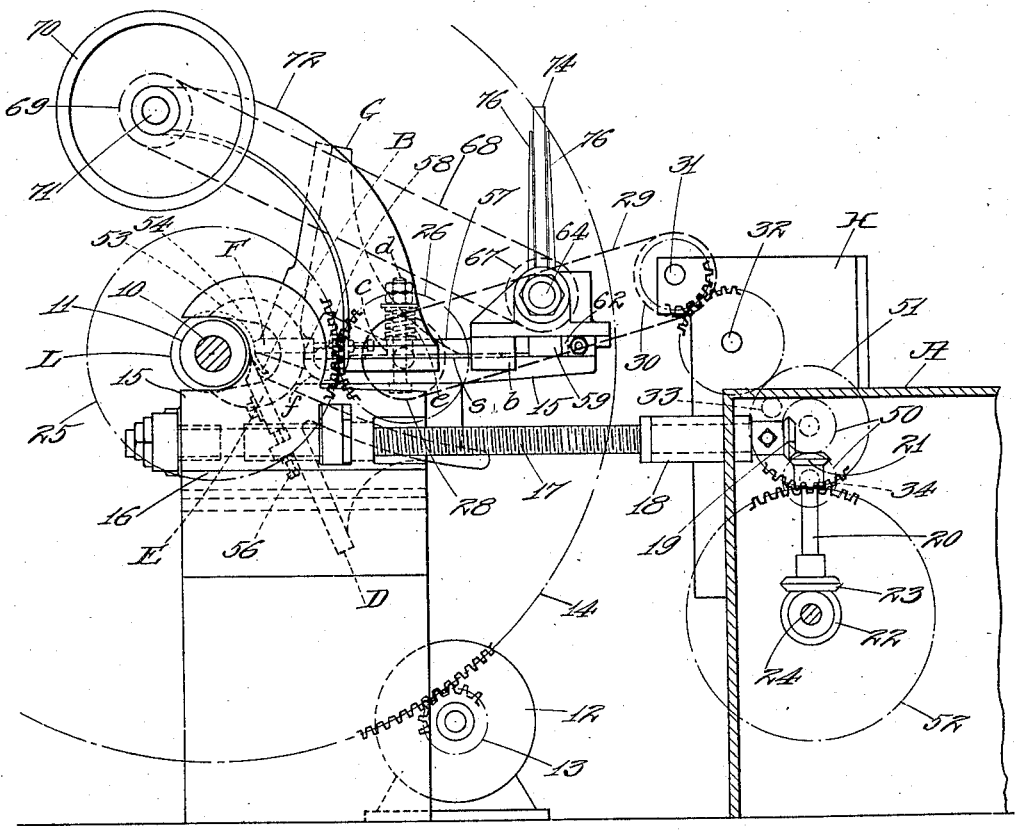
Fig. 2 is a side elevation as viewed from the right.
Fig. 4 is a section taken on line 4—4 of Fig. 1.
Fig. 5 is a rear elevation of the gear box H.

The way blocks 15 of the knife carriage are each provided with a large circular bearing 53 in which are mounted trunnions 54 formed on the knife bar D, the knife E being adjustable thereon by adjusting screws 56. The way blocks 15 are extended toward the rear and are provided with lugs b to receive two members 57 which are known as sole plates and which are slidable on antifriction shims s between the lugs on the way blocks toward the centre of the log. To hold the sole plates in place and permit slidable movement thereof whenever the thickness of veneer is changed, each sole plate is yieldingly mounted on the way block. As shown in Figs. 1 and 2, each sole plate 57 is provided with an elongated slot c through which passes a bolt d rigidly connected to the way block. The sole plate is held in place by a spring e which bears at one end against a nut secured to the bolt and at the other end against the top surface of the sole plate. It will therefore be seen that the sole plates, may be moved laterally of the machine, without the necessity of first unloosening any nuts and at the same time they are held yieldingly in place on the way blocks so that they cannot be displaced by sudden upward stresses which may occur when cutting veneer as for instance when the knife encounters a knot in the log. The front ends of the sole plate 57 are provided with bearings f to receive the trunnions 58 formed on the ends of the pressure bar support G. The pressure bar support can therefore be swung on the trunnions 58 to move the pressure bar F out of operative position when it is necessary to bark or slab the log, or to free chips in operation. It will also be seen that the two sole plates, the pressure bar support and the pressure bar itself form a unit which is slidable toward or away from the log.

Across the back of the lathe is located a wedge bar 59 provided with wedges 60 and 61 which co-operate with complementary wedge faces on the rear ends of the sole plates 57. The back faces of the wedges on the wedge portion 59 are straight and bear against straight faces of correcting wedges 62 which themselves co-operate with complementary wedge faces on abutments 63 which are parts of the rear end of the way blocks 15. It will therefore be seen that if the wedge bar 59 is moved lengthwise and toward the right as shown in Fig. 1, it will act on the sole plates and push the unit, which includes the pressure bar, toward the centre of the log. On the contrary, if the wedge bar 59 is moved to the left as shown in Fig. 1, the wedges 60 and 61 will be withdrawn and the unit, including the pressure bar, will be pushed back against the wedges by the pressure of the log on the knife and pressure bar. Since this pressure is large, it is unnecessary to provide other or more positive means for moving back the unit. It will also be seen that by moving one of the correcting wedges 62, any difference in adjustment between the ends of the pressure bar can be corrected. Above the wedge bar 59 is located a screw 64 engaged by a nut 3 which is carried by a bracket 100 secured to the wedge bar 59. This screw is mounted in a bearing 66 on one of the way blocks 15 at the right hand end of the machine and is provided with a sprocket 67 over which runs a chain 68. The chain 68 is operated by a sprocket 69 connected to a hand wheel 70, the shaft of which 71 is mounted in bearings in a bracket 72 which extends upwardly from the way block. It will therefore be seen that by rotating the handwheel 70 the screw 64 is rotated and the wedge bar is moved to the right or left as is required.

Above the screw 64 which operates the pressure bar adjusting mechanism is a bracket 73 on which is mounted a dial or quadrant 74. At the centre of this dial is a pivot 75 on which is mounted a pair of indicator fingers 76 on opposite sides of the dial so as to be visible both from the front and back of the machine. The indicator finger is extended below the pivot and terminates in a fork 77 which engages a projection 78 on the nut 3. The dial is calibrated for the proper positions of the pressure bar for each of the several thicknesses of veneer which are to be cut on the lathe. It will therefore be seen that as the operator adjusts the wedge bar by means of the handwheel 70 which moves the nut 3, the indicator fingers 76 will show on both sides of the lathe the position of the pressure bar. In practise, the lathe operator who stands at the front of the lathe adjusts the pressure bar to the proper position for the thickness of veneer which he is about to cut and at the same time one of the helpers stands at the rear of the machine to shift the tumbler gear handles of the gear box to give the proper feed to the knife carriage for that thickness of veneer. As these operations can be performed simultaneously and quickly, the work of adjusting the lathe for any given thickness of veneer is comparatively instantaneous, two to three seconds being sufficient for any change.

What I claim is:

1. In a rotary veneer lathe, the combination with means for rotating the log, a knife, a carriage for the knife, feed screws to move the carriage toward the center of the log, a common shaft for actuating the feed screws, a train of gearing connecting the means for rotating the log with said common shaft, said train including a positive change speed gearing having a plurality of lay shafts, sliding gears thereon, handles for moving said sliding gears and other gears meshing therewith, whereby the log-rotating means may be caused positively to rotate the feed screws at any of a large number of rates of speed.

2. In a rotary veneer lathe, the combination of means for rotating the log, a knife, a carriage therefor, mechanism for moving the carriage toward the centre of the log at a predetermined rate, said mechanism being driven by the log driving mechanism, a change speed gear between the log driving mechanism and the carriage moving mechanism, a pressure bar on the knife carriage, means for moving the pressure bar toward the centre of the log relatively to the knife, a plurality of wedge surfaces for adjusting the pressure bar and hand-operated means acting on all of said wedged surfaces simultaneously to give the pressure bar the adjustment proper for the relative rate of feed of the knife carriage.

3. In a rotary veneer lathe, the combination of means for rotating the log, a knife, a carriage therefor, mechanism for moving the carriage toward the centre of the log at a predetermined rate, said mechanism being driven by the log driving mechanism, a change speed gear between the log driving mechanism and the carriage moving mechanism, a pressure bar on the knife carriage, means for moving the pressure bar toward the centre of the log relatively to the knife, a plurality of wedge surfaces for adjusting the pressure bar and hand-operated means acting on all of said wedge surfaces simultaneously to give the pressure bar the adjustment proper for the relative rate of feed of the knife carriage, and an indicator operated by the wedge adjusting means to indicate the position of the pressure bar.

4. In a rotary veneer lathe, in combination with a knife and a pressure bar, sliding supports free to move toward the centre of the log and to which the pressure bar is pivoted, wedges adapted to move the supports toward the centre of the log, said supports being moved in the opposite direction when the wedges are withdrawn by the pressure of the log on the pressure bar.

5. In a rotary veneer lathe, in combination with a knife and a pressure bar, sliding supports free to move toward the centre of the log and to which the pressure bar is pivoted, wedges adapted to move the supports toward the centre of the log, said supports being moved in the opposite direction when the wedges are withdrawn by the pressure of the log on the pressure bar, and means acting on the wedges for moving them equal amounts simultaneously.

6. In a rotary veneer lathe, the combination of means for rotating the log, a knife, a carriage therefor, mechanism for moving the carriage toward the centre of the log at a predetermined rate, said mechanism being driven by the log driving mechanism, a change speed gear between the log driving mechanism and the carriage moving mechanism, a pressure bar on the knife carriage, means for moving the pressure bar toward the centre of the log relatively to the knife, a plurality of wedge surfaces for adjusting the pressure bar and hand operated means acting on all of said wedge surfaces simultaneously to give the pressure bar the adjustment proper for the relative rate of feed of the knife carriage, an abutment behind the wedges, and correcting wedges between the abutment and the first mentioned wedges.

7. In a rotary veneer lathe, in combination with a knife and a pressure bar, screw actuating means for adjusting the pressure bar toward the centre of the log, a nut engaging said actuating means, a finger moved by the said nut, and a dial cooperating with the said finger to indicate the position of the pressure bar.

8. In a rotary veneer lathe, in combination with a knife and a pressure bar, sliding supports for the pressure bar, wedges adapted to move the supports toward the centre of the log, a screw to move said wedges simultaneously, an indicator operated by said screw to indicate the position of the pressure bar.

9. In a rotary veneer lathe, in combination with a knife and a pressure bar, sliding supports for the pressure bar, wedges adapted to move the supports toward the centre of the log, a bar connecting said wedges, a screw, a nut on said screw, and connections between the nut and the wedge bar.

10. In a rotary veneer lathe, in combination with a knife and a pressure bar, sliding supports for the pressure bar, wedges adapted to move the supports toward the centre of the log, a bar connecting said wedges, a screw, a nut on said screw, connections between the nut and the wedge bar, an indicator, and connections between the nut and the indicator.

11. In a rotary veneer lathe, means for rotating the log, a knife, a screw for moving the knife toward the centre of the log, power operated mechanism driven by the log rotating means for actuating said screws to move the knife, selective change speed gearing between the screw operating means and the log drive, a pressure bar adjustable toward the centre of the log relative to the knife, rotary means for adjusting said pressure bar, and an indicator actuated by said rotary means to indicate the position of the pressure bar.

12. In a rotary veneer lathe, the combination with means for rotating a log, a knife, a carriage for the knife, feed screws to move the carriage toward the center of the log, a common shaft for actuating the feed screws, a train of gearing positively connecting the log-rotating means and the shaft which drives the feed screws, said train including a change speed gearing itself having two tumbler gear trains acting successively to vary the speed of the feed screws by a large number of rates.

13. In a rotary veneer lathe in combination with a knife and a pressure bar, sliding supports free to move toward the centre of the log and to which the pressure bar is pivoted and yielding abutments permitting displacement of the sliding supports tangentially of the cutting point.

14. In a rotary veneer lathe in combination with a knife and pressure bar, way blocks, supports free to slide in said way blocks toward the centre of the log, the pressure bar being pivoted to said sliding supports, anti-friction devices between the way blocks and the sliding supports and yielding abutments acting on said supports to hold them on the way blocks while permitting movement tangentially of the cutting point.

In testimony whereof I affix my signature.

THEODORE W. DIKE.